US005713117A

United States Patent [19]

Bliss

[11] Patent Number: 5,713,117

[45] Date of Patent: Feb. 3, 1998

[54] BUSHING PUSHER

[76] Inventor: John C. Bliss, R.D. #4 Box 249-3, Tunkhannock, Pa. 18657

[21] Appl. No.: 684,831

[22] Filed: Jul. 22, 1996

[51] Int. Cl.[6] ........ B23P 19/04

[52] U.S. Cl. ........ 29/257

[58] Field of Search ........ 29/251, 270, 257, 29/281.1, 256; 269/249

[56] References Cited

U.S. PATENT DOCUMENTS

| | | | |
|---|---|---|---|
| 3,234,634 | 2/1966 | Johnson et al. | 29/257 |
| 3,334,405 | 8/1967 | Cann et al. | 269/249 |
| 5,148,590 | 9/1992 | Wu | 29/257 |
| 5,271,136 | 12/1993 | Skowarodko | 29/257 |
| 5,586,378 | 12/1996 | Smith | 29/257 |

*Primary Examiner*—Robert C. Watson

[57] ABSTRACT

The present invention relates to a bearing insertion device which is specifically adapted for use in conjunction with an archery bow. In its broadest context, the present invention includes a C-shaped frame with an upper arm and a lower plate. A threaded driving member is adjustable positioned through the upper arm and is adapted for cooperation with the lower plate. At the lower end of this driving member a bushing pusher is secured. This bushing pusher is specifically adapted to engage the bushings found within archery bows.

1 Claim, 3 Drawing Sheets

BUSHING PUSHER

BACKGROUND OF THE INVENTION

1. Field of the Invention

The present invention relates to bushing pusher and more particularly pertains to such a device specifically adapted for use in conjunction with an archery bow.

2. Description of the Prior Art

The use of C-clamps is known in the prior art. More specifically, C-clamps heretofore devised and utilized for the purpose of securing an object are known to consist basically of familiar, expected, and obvious structural configurations, notwithstanding the myriad of designs encompassed by the crowded prior art which has been developed for the fulfillment of countless objectives and requirements.

For example, U.S. Pat. No. 4,654,944 to Graf discloses a overhead cam valve spring compressor adapter. U.S. Pat. No. 4,158,955 to Bustin discloses a depression forming tool. Furthermore, U.S. Pat. No. 4,582,307 to Wang; U.S. Pat. No. 5,423,525 to Spainhower; U.S. Pat. No. 4,747,590 to Yang; Des. U.S. Pat. No. 348,816 to Degen; U.S. Pat. No. 4,074, 899 to Hochstetler; and U.S. Pat. No. 4,823,636 to Suska each disclose a C-clamps.

In this respect, the bushing pusher according to the present invention substantially departs from the conventional concepts and designs of the prior art, and in doing so provides an apparatus primarily developed for the purpose of replacing bushing upon archery bows.

Therefore, it can be appreciated that there exists a continuing need for new and improved bushing pusher which can be used for replacing the bushings on archery bows. In this regard, the present invention substantially fulfills this need.

SUMMARY OF THE INVENTION

In view of the foregoing disadvantages inherent in the known types of C-clamps now present in the prior art, the present invention provides an improved bushing pusher. As such, the general purpose of the present invention, which will be described subsequently in greater detail, is to provide a new and improved bushing pusher and method which has all the advantages of the prior art and none of the disadvantages.

To attain this, the present invention essentially comprises a bearing insertion device specifically adapted for use in conjunction with an archery bow. The insertion device includes a C-shaped frame having an upper arm and a lower flat plate and an intermediate extent therebetween. The lower flat plate has an upper surface and a lower surface and a thickness of approximately ⅛ inch. A threaded aperture is formed within the upper arm, and an axial hole formed through the upper surface of the lower flat plate. This hole has a diameter of approximately ⅜ inch and is specifically adapted to receive the bushing from an archery bow. The device further includes a threaded driving member having a first end and a second end and an intermediate extent therebetween. An aperture is formed within the first end, and a cross member is positioned within the aperture of the first end of the driving member. The threaded driving member is threadably secured within the threaded aperture of the upper arm. A collar having a opened first end, an opened second end and a threaded interior surface therebetween is adapted to be secured to the second end of the driving member. A bushing pusher is adapted to be secured to the second end of the driving member, this pusher is defined by a base end and a cylindrical body. The cylindrical body of the pusher is approximately ½ inch in length. The opened first end of the collar is threadably secured to the second end of the threaded driving member such that the base end of the pusher is in contact with the second end of the driving member and the cylindrical body of the pusher extends outwardly from the opened second end of the collar. The cylindrical body of the pusher is specifically adapted to engage the bushing of an archery bow.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved bushing pusher which have all the advantages of the prior art C-clamps and none of the disadvantages.

It is another object of the present invention to provide new and improved bushing pusher which may be easily and efficiently manufactured and marketed.

It is further object of the present invention to provide new and improved bushing pusher which are of durable and reliable constructions.

An even further object of the present invention is to provide new and improved bushing pusher which are susceptible of a low cost of manufacture with regard to both materials and labor, and which accordingly are then susceptible of low prices of sale to the consuming public, thereby making such bushing pusher economically available to the buying public.

Still yet another object of the present invention is to provide new and improved bushing pusher which provide in the apparatuses and methods of the prior art some of the advantages thereof, while simultaneously overcoming some of the disadvantages normally associated therewith.

Even still another object of the present invention is to provide an device specifically adapted for replacing the bushings on archery bows.

Lastly, it is an object of the present invention to provide new and improved a bearing insertion device which is specifically adapted for use in conjunction with an archery bow. In its broadest context, the present invention includes a C-shaped frame with an upper arm and a lower plate. A threaded driving member is adjustable positioned through the upper arm and is adapted for cooperation with the lower plate. At the lower end of this driving member a bushing pusher is secured. This bushing pusher is specifically adapted to engage the bushings found within archery bows.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
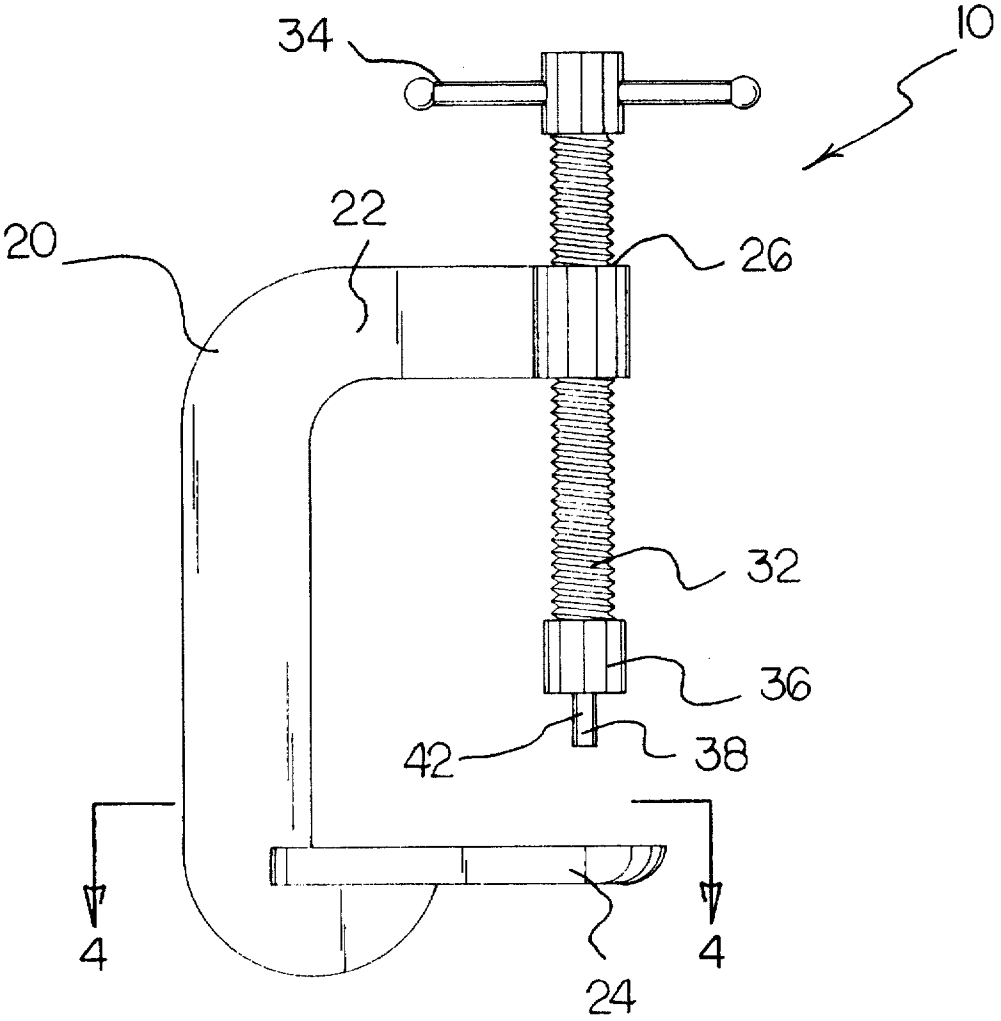
FIG. 1 is a perspective view of the preferred embodiment of the bushing pusher constructed in accordance with the principles of the present invention.
Figure 2:
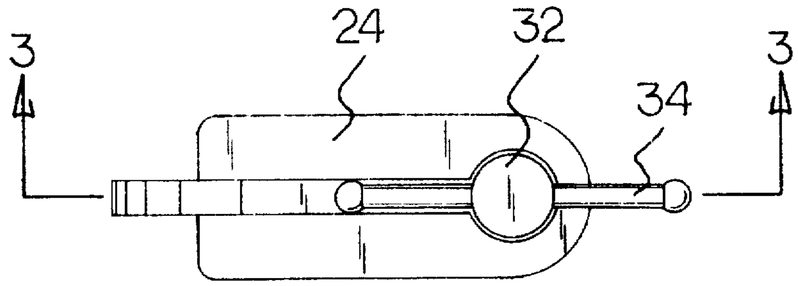
FIG. 2 is a plan view of the device in accordance with the present invention.
Figure 3:
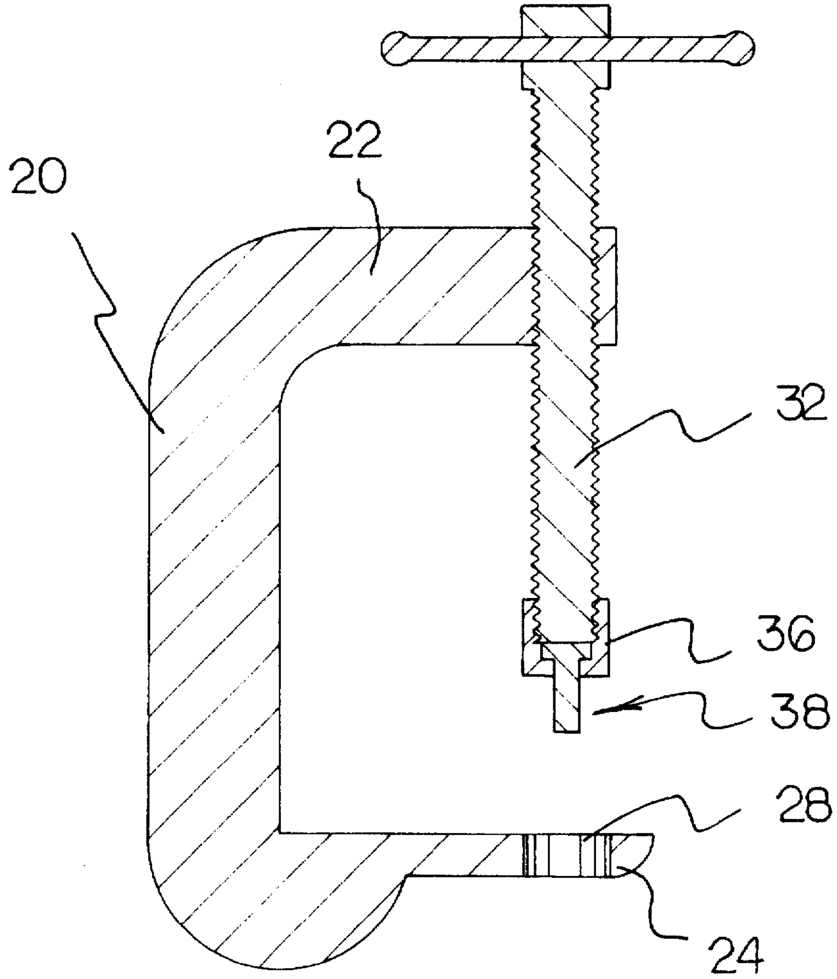
FIG. 3 is a sectional view taken along line 3—3 of FIG. 2.

With reference now to the drawings, and in particular to FIG. 1 thereof, the preferred embodiment of the new and improved bushing pusher embodying the principles and concepts of the present invention and generally designated by the reference numeral 10 will be described.

The present invention relates to a bearing insertion device which is specifically adapted for use in conjunction with an archery bow. In its broadest context, the present invention includes a C-shaped frame with an upper arm and a lower plate. A threaded driving member is adjustable positioned through the upper arm and is adapted for cooperation with the lower plate. At the lower end of this driving member a bushing pusher is secured. This bushing pusher is specifically adapted to engage the bushings found within archery bows. The various components of the present invention, and the manner in which they interrelate, will be described in greater detail hereinafter.

Figure 4:
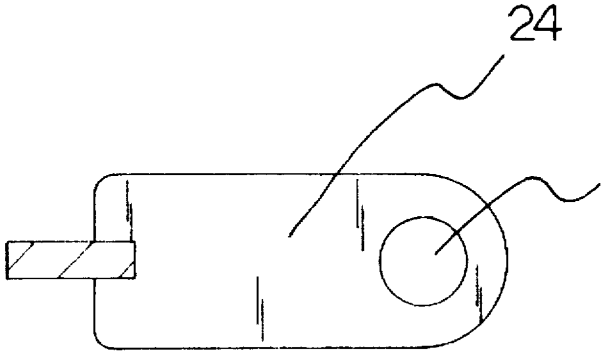
FIG. 4 is a view taken along line 4—4 of FIG. 1.
Figure 5:
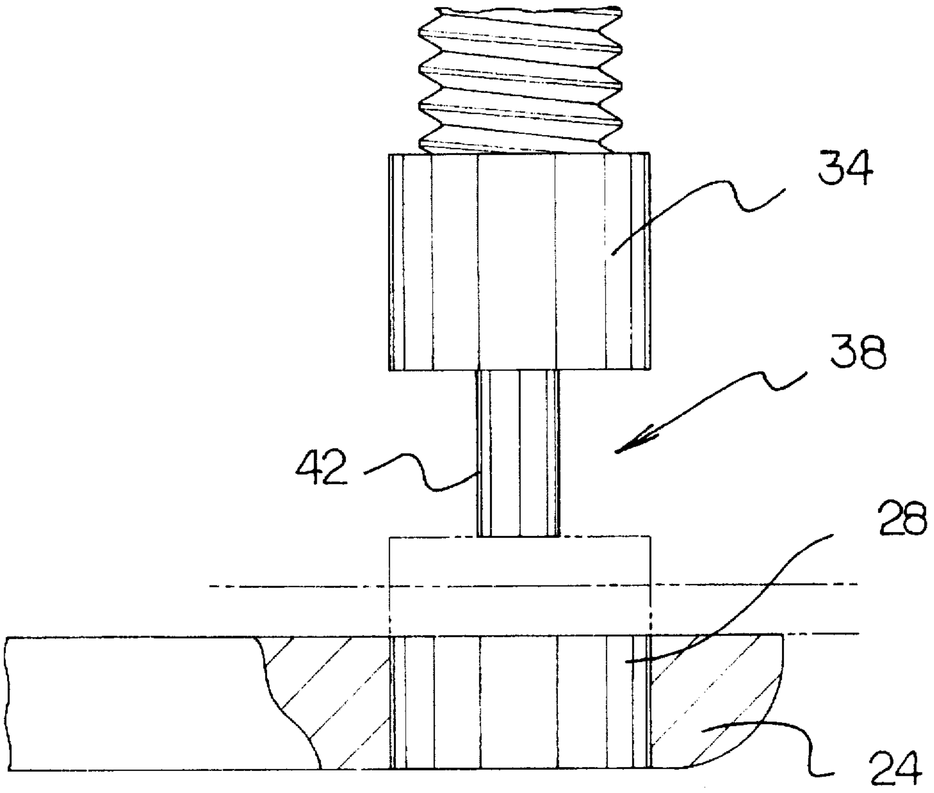
FIG. 5 is a view of the pusher with a bushing shown in phantom.
Figure 6:
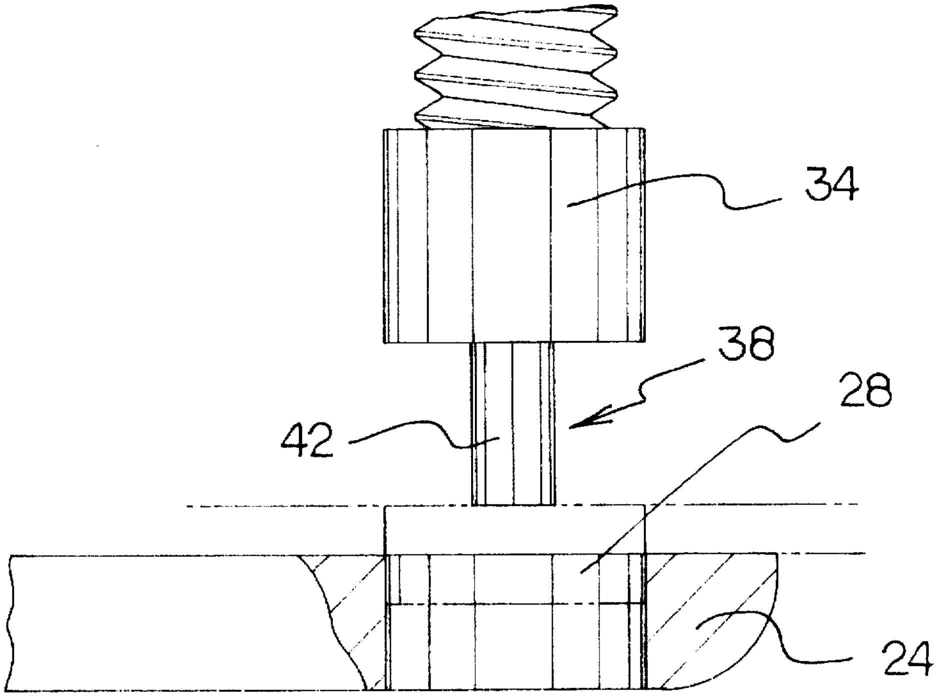
FIG. 6 is a view of the pusher with a bushing shown in phantom.

The major structural component of the present invention is the C-shaped frame 20. This frame is defined by an upper arm 22, a lower flat plate 24 and an intermediate extent therebetween. The lower flat plate 24 includes an upper surface and a lower surface. In the preferred embodiment, this lower flat plate 24 has a thickness of approximately ⅛ inch. This thickens has been found to work well as the device is employed upon an archery bow. Furthermore, a threaded aperture 26 is formed within the upper arm of the C-shaped frame 20. The function of this aperture will be described in greater detail hereinafter. Additionally, as best illustrated in FIG. 4, an axial hole 28 is formed through the upper surface of the lower flat plate 24. This hole 28 is specifically dimensioned to receive the bushings from archery bows. To this end, the hole 28 of the lower flat plate 24 has a diameter of approximately ⅜ inch and a length equal to the thickness of the lower flat plate.

A threaded driving member 32 is adjustable secured to the upper arm 22 of the device. More specifically, the threaded driving member 32 is threadably secured within the threaded aperture 26 of the upper arm 22. This driving member 32 is defined by a first end, a second end and an intermediate extent therebetween. Additionally, an aperture is formed within the first end of the driving member 32. Furthermore, a cross member 34 is positioned within the aperture of the first end of the driving member 32. The cross member 34 provides a convenient means by which the driving member 32 can be rotated.

A collar 36, defined in part by an opened first end, an opened second end and a threaded interior surface therebetween, is adapted to be removably secured to the second end of the driving member 32. The collar 36 functions in removably securing a bushing pusher 38 to the second end of the threaded member. The bushing pusher 38 is defined by a base end and a cylindrical body 42. In order to facilitate the use of the pusher 38 with archery bow bushings, the cylindrical body 42 of the pusher 38 being is approximately ½ inch in length. Thus, the opened first end of the collar 36 is threadably secured to the second end of the threaded driving member 32 such that the base end of the pusher 38 is in contact with the second end of the driving member 32. In this manner, the cylindrical body 42 of the pusher 38 extends outwardly from the opened second end of the collar 36.

In use, the device of the present invention is positioned over an archery bow bushing to be replaced. Next, the driving member is threadably driven downwardly such that the cylindrical body of the pusher comes into contact with the bushing. In this manner, the pusher can be employed in pushing an old bushing out through the hole of the lower flat plate. Alternatively, the device can be employed to simultaneously insert and remove a bushing. This can be achieved by first placing a new bushing upon the bushing pusher. In this manner, as the old bushing is being removed the new one is being inserted.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bearing insertion device specifically adapted for use in conjunction with an archery bow, the insertion device comprising in combination:

a C-shaped frame having an upper arm and a lower flat plate and an intermediate extent therebetween, the lower flat plate having an upper surface and a lower surface and a thickness of approximately ⅛ inch for effective removal and replacement of a bushing on the archery bow, a threaded aperture formed within the upper arm, an axial hole formed through the upper surface of the lower flat plate, the hole having a diameter of approximately ⅜ inch and a length equal to the thickness of the lower flat plate, and specifically adapted to receive the bushing from an archery bow;

a threaded driving member being adjustable secured to the upper arm of the C-shaped frame, the threaded driving member being threadably secured within the threaded aperture of the upper arm, the threaded driving member having a first end and a second end and an intermediate extent therebetween, an aperture formed within the first end, a cross member positioned within the aperture of the first end of the driving member, the threaded driving member threadably secured within the threaded aperture of the upper arm;

a collar defined in part by an opened first end, an opened second end and a threaded interior surface therebetween, the threaded interior surface being adapted to be removably secured to the second end of the driving member, a bushing pusher having a base end and a cylindrical body, the cylindrical body of the bushing pusher being approximately ½ inch in length, the opened first end of the collar threadably secured to the second end of the threaded driving member such that the base end of the bushing pusher is in contact with the second end of the driving member and the cylindrical body of the pusher extends outwardly from the opened second end of the collar, a new bushing being positioned on the bushing pusher, the cylindrical body of the bushing pusher specifically adapted to engage the worn bushing of an archery bow and simultaneously pushing the worn bushing through the bow and out the axial hole and leaving the new bushing within the archery bow.

* * * * *